United States Patent
Jomori et al.

(10) Patent No.: US 8,163,432 B2
(45) Date of Patent: Apr. 24, 2012

(54) FUEL CELL

(75) Inventors: Shinji Jomori, Susono (JP); Naoki Takehiro, Shizuoka-ken (JP); Tatsuya Arai, Susono (JP); Keiichi Kaneko, Fuji (JP); Takumi Taniguchi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 160 days.

(21) Appl. No.: 12/675,092

(22) PCT Filed: Dec. 12, 2008

(86) PCT No.: PCT/JP2008/072634
§ 371 (c)(1),
(2), (4) Date: Apr. 22, 2010

(87) PCT Pub. No.: WO2010/067453
PCT Pub. Date: Jun. 17, 2010

(65) Prior Publication Data
US 2011/0123896 A1     May 26, 2011

(51) Int. Cl.
*H01M 8/10* (2006.01)
(52) U.S. Cl. ........................... 429/457; 429/514
(58) Field of Classification Search ............. None
See application file for complete search history.

(56) References Cited

U.S. PATENT DOCUMENTS 7,074,514 B2 * 7/2006 Matsukawa .................. 429/514

FOREIGN PATENT DOCUMENTS

| JP | 08-138696 A | 5/1996 |
| JP | 11-016591 A | 1/1999 |
| JP | 2004-247154 A | 9/2004 |
| JP | 2005-079063 A | 3/2005 |
| JP | 2005-085626 A | 3/2005 |
| JP | 2008-282821 A | 11/2008 |
| WO | WO 2008/056518 A1 | 5/2008 |

\* cited by examiner

*Primary Examiner* — John S Maples
(74) *Attorney, Agent, or Firm* — Kenyon & Kenyon LLP

(57) ABSTRACT

The present invention provides a fuel cell capable of inhibiting desiccation and flooding of a membrane electrode assembly. The fuel cell has a laminated body having a membrane electrode assembly including an electrolyte membrane sandwiched by an anode catalyst layer and a cathode catalyst layer. A pair of separators sandwiches the laminated body, and between at least one separator and the laminated body, inlet and outlet passages are formed. The inlet passage is blocked at a downstream end of the reaction gas supplied to the laminated body and the outlet passage is blocked at an upstream end of the reaction gas having passed through the laminated body. The inlet passage and the outlet passage are arranged separately from each other. The depth of the upstream region of the inlet passage is larger than that of the downstream region of the inlet passage.

3 Claims, 3 Drawing Sheets

FUEL CELL

This is a 371 national phase application of PCT/JP2008/072634 filed 12 Dec. 2008, the contents of which are incorporated herein by reference.

TECHNICAL FIELD

The present invention relates to a fuel cell, particularly relates to a fuel cell having inlet passage or outlet passage either of which is blocked.

BACKGROUND ART

A fuel cell is an apparatus which produces electrochemical reaction at the membrane electrode assembly (hereinafter, refer to as "MEA".) comprising: an electrolyte layer (hereinafter, refer to as "electrolyte membrane".); and electrodes (an anode catalyst layer and a cathode catalyst layer) being disposed on each surface of the electrolyte membrane to take the electric energy generated by the electrochemical reaction out from the MEA. Among the fuel cells, a solid polymer electrolyte fuel cell (hereinafter, refer to as "PEFC".) used for, e.g., household cogeneration system and automobiles can be operated in a low temperature region. Because of high energy conversion efficiency, short start-up time, and small-sized and lightweight system, the PEFC has attracted attention as a power source of battery car or a portable power supply.

A unit cell of the PEFC comprises an MEA and a pair of current collectors (separators) sandwiching a laminated body including the MEA, wherein the MEA contains a proton-conducting polymer which exhibits proton conductivity. When operating the PEFC, a hydrogen-based gas (hereinafter, refer to as "hydrogen".) is supplied to the anode and an oxygen-based gas (hereinafter, refer to as "air".) is supplied to the cathode. The hydrogen supplied to the anode breaks down into a proton and an electron under action of catalyst contained in the anode catalyst layer; the proton derived from the hydrogen reaches the cathode catalyst layer through the anode catalyst layer and the electrolyte membrane. On the other hand, the electron reaches the cathode catalyst layer through an external circuit; by these processes, it is capable of taking the electric energy out. Meanwhile, the protons and electrons both having reached the cathode catalyst layer react with the oxygen contained in the air supplied to the cathode catalyst layer under action of catalyst contained in the cathode catalyst layer to produce water.

By keeping a proton-conducting polymer contained in the MEA in moisture state, it is possible to reduce proton conductivity resistance. So, when operating the PEFC, a humidified hydrogen and a humidified air (hereinafter, these may be summed up as "reaction gas".) are supplied to the unit cell to keep the MEA in moisture state. However, the water existing in the unit cell can move together with the reaction gas towards the flow direction of the reaction gas. Therefore, within the MEA, mal-distribution of water may be caused. Specifically, an MEA region facing the upstream of the reaction-gas flow direction tends to be dried compared with other MEA regions facing the downstream of the reaction-gas flow direction. At the downstream of the reaction-gas flow direction, liquid water tends to be pooled and the pooled water often causes flooding. When the MEA is dried, proton conductivity resistance increases which results in decrease in PEFC's electricity generating performance. In addition, once flooding is caused, diffusion of reaction gas is inhibited, which results in decrease in frequency of occurrence of electrochemical reaction; thereby PEFC's electricity generating performance is decreased. Hence, to improve PEFC's electricity generating performance, it is necessary to inhibit occurrence of desiccation and flooding of the MEA.

Conventionally, as an art to inhibit flooding, a PEFC having reaction-gas flow passage of which inlet passage or outlet passage is blocked (hereinafter, refer to as "blocked passage".) has been developed. By the mode having the blocked passage, it becomes possible to diffuse a large amount of reaction gas at regions of the laminated body facing a site of separator (hereinafter, refer to as "projection portion".) located between neighboring passages. Thus, this mode of the PEFC makes it possible to improve its drainage.

For example, Patent document 1 discloses an art relating to a PEFC having a blocked passage.

Patent Document 1: Japanese Patent Application Laid-Open (JP-A) No. 11-016591

DISCLOSURE OF THE INVENTION

Problems to be Solved by the Invention

In the art disclosed in Patent document 1, a blocked passage is formed on a current collector (separator) so that a large amount of reaction gas can be diffused in a region of the laminated body facing the projection portion. So, it is assumed that it becomes possible to inhibit accumulation of liquid water at a region of the laminated body facing the projection portion. However, in the art of Patent document 1, reaction gas rapidly passes at the vicinity of the inlet port of the blocked passage (hereinafter, refer to as "inlet passage".) of which outlet passage is blocked. Therefore, the art of Patent document 1 has a problem that water tends to be removed from a region of MEA facing the vicinity of the inlet port of the inlet passage, whereby the region tends to be dried.

Accordingly, an object of the present invention is to provide a fuel cell having blocked passage and showing capability of inhibiting desiccation and flooding of the membrane electrode assembly.

Means for Solving the Problems

To solve the above problems, the present invention takes the following means. In other words, the invention is a fuel cell comprising: a laminated body comprising at least a membrane electrode assembly which includes: an electrolyte membrane, an anode catalyst layer arranged on one surface of the electrolyte membrane, and a cathode catalyst layer arranged on the other surface of the electrolyte membrane; and a pair of separators sandwiching the laminated body, wherein, between the pair of separators, along the laminated body side surface of at least one separator, an inlet passage is provided for getting through a reaction gas supplied to the laminated body and an outlet passage is provided for getting through a reaction gas having passed through the laminated body; the inlet passage is blocked at a downstream end of the reaction gas being supplied to the laminated body and the outlet passage is blocked at an upstream end of the reaction gas having passed through the laminated body; the inlet passage and the outlet passage are arranged separately from each other along the separator; and the depth of the upstream region of the inlet passage is larger than that of the downstream region of the inlet passage.

In the invention, the phrase "a laminated body comprising at least a membrane electrode assembly" means a concept which includes a laminated body having a membrane electrode assembly and another laminated body comprising a membrane electrode assembly and other elements. As the "other elements" provided to the laminated body may be, among elements sandwiched between a pair of separator in a unit cell of a PEFC, known elements (for instance, a gas diffusion layer arranged between the MEA and the separator) except for the MEA can be used. Moreover, in the invention, the phrases "a reaction gas supplied to the laminated body" and "a reaction gas having passed through the laminated body" mean a hydrogen-based gas or an oxygen-based gas. Further, in the invention, the phrase "getting a reaction gas through" means that at least a reaction gas passes through the passage; together with the reaction gas, the expression allows water and the like, which are produced by the electric generation of the fuel cell, to pass through the passage. Still further, in the invention, the phrase "the inlet passage and the outlet passage are arranged separately from each other along the separator" means a case where the inlet passage and the outlet passage are provided only on one of a pair of separators but the other separator is not provided with the blocked passage (namely, in a case where passages of which inlet port and outlet port are opened only are provided). On the other hand, when providing the inlet passage and the outlet passage to each one of the pair of separators, the phrase means that the inlet passage and the outlet passage both provided to each separator are arranged separately from each other. Still further, in the invention, the phrase "the upstream region of the inlet passage" means a region from the midway of the total length of the inlet passage (length of reaction-gas flow direction in the inlet passage; below, it is the same.) to the upstream end (inlet port) of the inlet passage. Still further, in the invention, the phrase "the downstream region of the inlet passage" means a region from the midway of the total length of the inlet passage to the downstream end (blocked portion) of the inlet passage. Still further, in the invention, the phrase "the depth of the upstream region of the inlet passage is larger than that of the downstream region of the inlet passage" means that depth of the inlet passage at an upstream point located certain distance "x" (x>0; below, it is the same.) from the midway of the total length of the inlet passage is larger than that of the inlet passage at a downstream point located certain distance "x" from the midway.

In addition, in the above invention, along the separator where the inlet passage and the outlet passage are arranged, the depth of the downstream region of the outlet passage is preferably larger than that of the upstream region of the outlet passage.

Here, in the invention, the phrase "the downstream region of the outlet passage" means a region from the midway of the total length of the outlet passage (length of the reaction-gas flow direction in the outlet passage; below, it is the same.) to the downstream end (outlet port) of the outlet passage. Moreover, in the invention, the phrase "the upstream region of the outlet passage" means a region from the midway of the total length of the outlet passage (length of the reaction-gas flow direction in the outlet passage; below, it is the same.) to the upstream end (blocked portion) of the outlet passage. Further, in the invention, the phrase "the depth of the downstream region of the outlet passage is larger than that of the upstream region of the outlet passage" means that depth of the outlet passage at a downstream point located certain distance "x" from the midway of the total length of the outlet passage is larger than that of the outlet passage at an upstream point located certain distance "x" from the midway.

Moreover, in the invention, the one separator can be arranged on the side of the cathode catalyst layer.

Here, in the invention, the phrase "the one separator is arranged on the side of the cathode catalyst layer" means to arrange, on at least cathode catalyst layer side, a separator (hereinafter, the mode is referred to as "the first mode".) such that the depth of the inlet passage is controlled as above or another separator (hereinafter, the mode is referred to as "the second mode".) such that the depth of the inlet passage and the outlet passage are controlled as above. As it were, the fuel cell of the invention only requires that the separator of the first mode or the separator of the second mode is arranged on at least the cathode catalyst layer side. Examples of possible mode of the separator arranged at the anode catalyst layer side of the fuel cell of the invention include, apart from the first mode and the second mode, a mode comprising inlet passages and outlet passages having a substantially certain depth along the entire length thereof or another mode only comprising passages whose inlet port and outlet port are opened.

Effects of the Invention

In the fuel cell of the present invention, the depth of the upstream region of the inlet passage is larger than that of the downstream region of the inlet passage. This structure enables to lower the flow rate of the reaction gas passing at the upstream region of the inlet passage and enables to inhibit desiccation of the MEA by inhibiting removal of excessive amount of water from the MEA. In addition, by enlarging not the width but the depth of the inlet passage at the upstream region, it becomes possible to increase the side surface area of inlet passage cooled with a cooling medium passing through inside the separator; thereby it is capable of easily inhibiting desiccation. Moreover, by making the depth of the downstream region of the inlet passage be smaller than that of the upstream region of the inlet passage, it becomes possible to raise flow rate of the reaction gas passing at the downstream region of the inlet passage. So, this can inhibit flooding at the downstream region of the inlet passage and at the laminated body facing the downstream region of the inlet passage. Hence, according to the fuel cell of the invention, the invention can provide a fuel cell having a blocked passage and showing capability of inhibiting desiccation and flooding of the MEA.

Further, in the fuel cell of the invention, by making the depth of the downstream region of the outlet passage be larger than that of the upstream region of the outlet passage, it becomes possible to lower the flow rate of the reaction gas passing at the downstream region of the outlet passage; thereby it is possible to inhibit desiccation of the MEA by inhibiting removal of excessive amount of water from the MEA facing the downstream region of the outlet passage. In addition, by enlarging not the width but the depth of the outlet passage at the downstream region, it becomes possible to increase the side surface area of outlet passage cooled with a cooling medium passing through inside the separator; thereby it is capable of easily inhibiting desiccation. Moreover, by making the depth of the upstream region of the outlet passage be smaller than that of the downstream region of the outlet passage, it becomes possible to raise flow rate of the reaction gas passing at the upstream region of the outlet passage. Therefore, this can inhibit flooding at the upstream region of the outlet passage and at the laminated body facing the upstream region of the outlet passage. Hence, according to the mode, the invention can easily inhibit desiccation and flooding of the MEA.

Still further, in the fuel cell of the invention, since separators having the inlet passages or both the inlet passages and the outlet passages those of which depth is controlled are arranged on at least the cathode catalyst layer side, distribution of water can be homogenized at the cathode catalyst layer side where desiccation and flooding of the MEA tend to occur. Accordingly, by the above mode, desiccation and flooding of the MEA can be easily inhibited.

Figure 1:
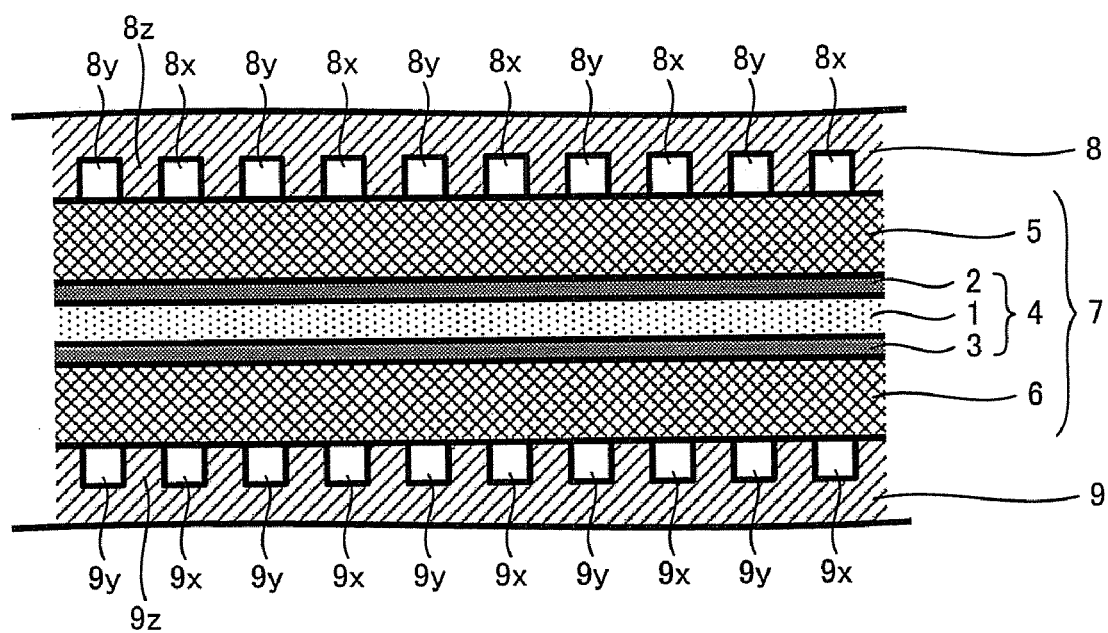
FIG. 1 is a cross-sectional view showing a mode of the fuel cell 10 of the present invention.

DESCRIPTION OF THE REFERENCE NUMERALS 1 electrolyte membrane
2 anode catalyst layer
3 cathode catalyst layer
4 MEA (membrane electrode assembly)
5 gas diffusion layer
6 gas diffusion layer
7 laminated body
8 separator
8x inlet passage
8y outlet passage
8z projection portion
9 separator
9x inlet passage
9y outlet passage
9z projection portion
10 fuel cell

BEST MODE FOR CARRYING OUT THE INVENTION

When operating PEFC, amount of water contained in the laminated body incorporating the MEA is different depending on the mode of the laminated body, structure of passage for hydrogen passing along the anode catalyst layer side, structure of passage for air passing along the cathode catalyst layer side, and operating condition; even in the surface of the anode catalyst layer and the cathode catalyst layer, mal-distribution of water can occur. Because of this, flooding is sometimes caused at a particular site in the surface due to the excessive water and other sites in the same surface cause desiccation due to the shortage of water. This phenomenon is attributed to the fact that, for example, the amount of water removed from the reaction gas differs depending on the site of the anode catalyst layer and the cathode catalyst layer.

The present inventors discovered that there is a relation between the flow rate of the reaction gas and the amount of water removed by the reaction gas. Based on the relation, it is assumed that the amount of water which is removed by the reaction gas can be increased by raising the flow rate of the reaction gas and the amount of water which is removed by the reaction gas can be reduced by lowering the flow rate of the reaction gas.

Accordingly, the present invention has been created based on the above finding; it provides a fuel cell having blocked passages and showing capability of inhibiting desiccation and flooding of the membrane electrode assembly by controlling the depth of the inlet passage and the outlet passage.

Hereinafter, the invention will be described with reference to the drawings. It should be noted that the modes shown below are examples of the present invention so that the invention is not limited by the modes.

FIG. 1 is a cross-sectional view showing a mode of the fuel cell 10 of the present invention. The vertical direction of the sheet of FIG. 1 is the depth direction of the inlet passages 8x, 8x, . . . , the outlet passages 8y, 8y, . . . , the inlet passage 9x, 9x, . . . , and the outlet passage 9y, 9y, . . . . The back-to-front or front-to-back direction of the sheet of FIG. 1 is the flow direction of the reaction gas to be supplied to the membrane electrode assembly 4.

As shown in FIG. 1, the fuel cell 10 of the invention comprises a laminated body 7 comprising: a MEA 4 which includes an electrolyte membrane 1, an anode catalyst layer 2 formed on one surface of the electrolyte membrane 1, and a cathode catalyst layer 3 formed on the surface opposite to the surface of electrolyte membrane 1 to which the anode catalyst layer 2 is formed; a gas diffusion layer 5 arranged on the anode catalyst layer 2 side; and a gas diffusion layer 6 arranged on the cathode catalyst layer 3 side, the fuel cell 10 further comprises a separator 8 provided on the gas diffusion layer 5 side; and a separator 9 provided on the gas diffusion layer 6 side. Along the face of gas diffusion layer 5 side of the separator 8, inlet passages 8x, 8x, . . . and outlet passages 8y, 8y, . . . for getting hydrogen through are provided; in the separator 8, a space for getting a cooling medium through (not shown) is provided. Moreover, along the gas diffusion layer 6 side of the separator 9, inlet passages 9x, 9x, . . . and outlet passages 9y, 9y, . . . for getting the air through are provided; in the separator 9, a space for getting a cooling medium through (not shown) is provided.

Figure 2:
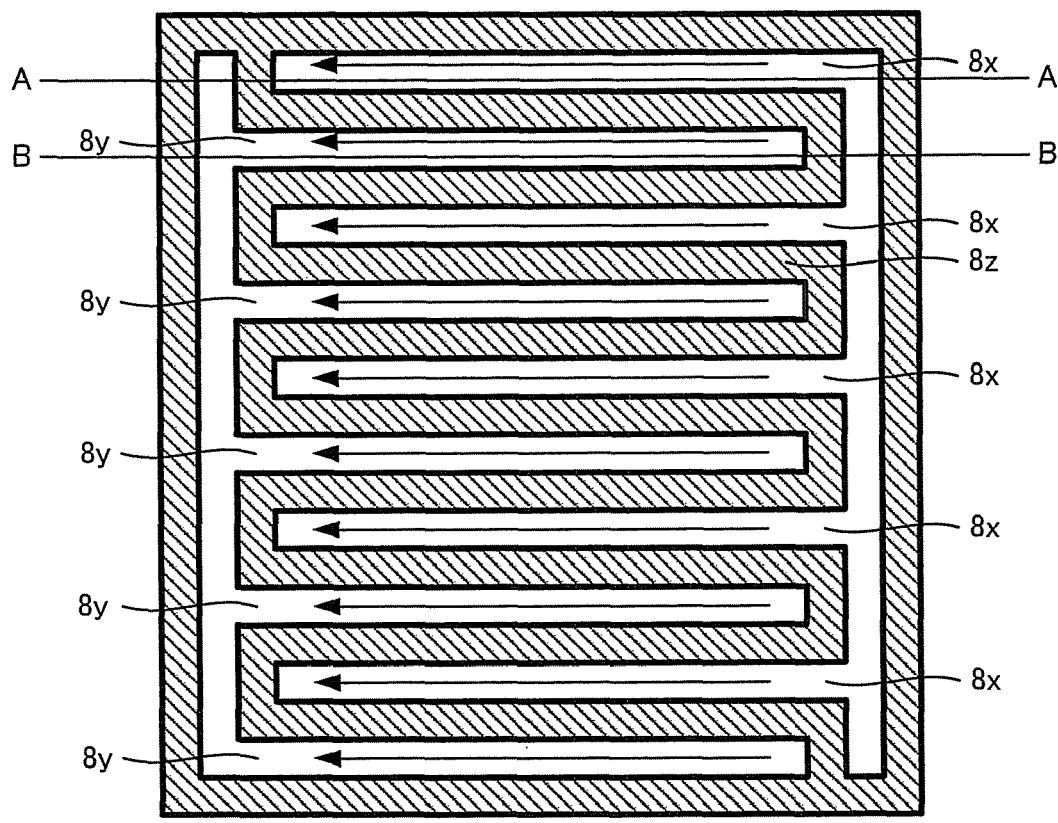
FIG. 2 is a plan view schematically showing a mode of the separator 8.

FIG. 2 is a plan view schematically showing a mode of the separator 8. The front-to-back direction of the sheet of FIG. 2 is the depth direction of the inlet passages 8x, 8x, . . . and the outlet passages 8y, 8y, . . . . The arrows in FIG. 2 show flow direction of hydrogen; the left side of the sheet of FIG. 2 corresponds to the front side of FIG. 1.

As shown in FIG. 2, the inlet passages 8x, 8x, . . . are blocked at the downstream end of hydrogen and the outlet passages 8y, 8y, . . . are blocked at the upstream end of hydrogen. As shown in FIG. 2, the inlet passages 8x, 8x, . . . and the outlet passages 8y, 8y, . . . respectively provided to the separator 8 are alternately and separately arranged; these are not connected to each other. Because of this, in the fuel cell 10, hydrogen supplied through the inlet passages 8x, 8x, . . . diffuses towards the gas diffusion layer 5 and the anode catalyst layer 2; subsequently, the hydrogen having passed through the gas diffusion layer 5 and the anode catalyst layer 2 reaches the outlet passages 8y, 8y, . . . . Therefore, according to the fuel cell 10, it is possible to easily diffuse hydrogen into the gas diffusion layer 5 and the regions of the anode catalyst layer 2 both of which face the projection portion 8z formed between neighboring the inlet passage 8x and the outlet passage 8y (hereinafter, refer to as "the projection portion 8z facing region".). Hence, the fuel cell 10 can inhibit pool of liquid water in the projection portion 8z facing region and eventually inhibit flooding.

Figure 3:
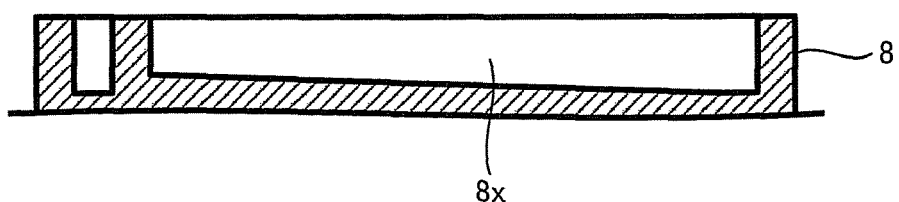
FIG. 3 is a cross-sectional view schematically showing a mode of the inlet passage 8x.

FIG. 3 is a cross sectional view taken along the line A-A of FIG. 2. The upper side of the sheet of FIG. 3 corresponds to the front side of FIG. 2; the vertical direction of the sheet of FIG. 3 is the depth direction of FIG. 3.

As shown in FIGS. 2 and 3, the inlet passages 8x, 8x, . . . are formed such that the depth of upstream region (The region is shown as "X1" in FIG. 3; below, it is the same.) is larger than that of the downstream region (The region is shown as "Y1" in FIG. 3; below, it is the same.). So, it is possible to lower the flow rate of hydrogen passing through the upstream region of the inlet passages 8x, 8x, . . . and also possible to inhibit removal of excessive amount of water from a part of region of the MEA 4 facing the upstream region of the inlet passages

8x, 8x, . . . . In addition, since the inlet passages 8x, 8x, . . . are formed such that the depth of the upstream region is larger than that of the downstream region, it is capable of increasing the side surface area at the upstream region of the inlet passage 8x, 8x, . . . cooled with a cooling medium. By the above structure, it is possible to inhibit extreme temperature increase at the part of region of the MEA 4 facing the upstream region of the inlet passages 8x, 8x, . . . ; whereby evaporation of excessive amount of water (removal of excessive amount of water) from the region of the MEA 4 can be inhibited. By inhibiting removal of excessive amount of water, desiccation can be inhibited at the part of region of the MEA 4 facing the upstream region of the inlet passages 8x, 8x, . . . ; hence, the fuel cell 10 can inhibit desiccation of the MEA 4.

Moreover, as shown in FIGS. 2 and 3, the inlet passages 8x, 8x, . . . are formed such that the depth of the downstream region is smaller than that of the upstream region. Due to this, it is possible to raise flow rate of hydrogen passing through the downstream region of the inlet passages 8x, 8x, . . . and also possible to increase the amount of water removed from the downstream region of the inlet passages 8x, 8x, . . . and a part of region of the laminated body 7 facing the downstream region of the inlet passages 8x, 8x, . . . . By increasing the amount of water to be removed, it is possible to inhibit flooding at the downstream region of the inlet passages 8x, 8x, . . . and the part of region of the laminated body 7 facing the downstream region of the inlet passages 8x, 8x, . . . ; thereby, the fuel cell 10 can inhibit flooding.

Figure 4:
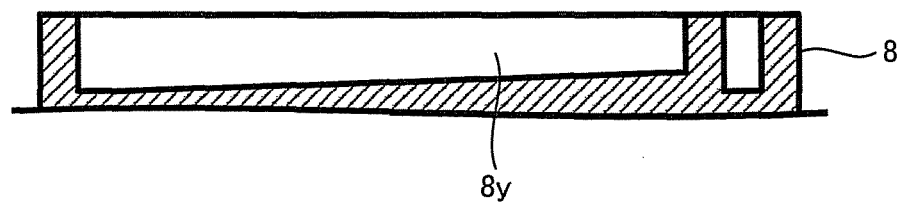
FIG. 4 is a cross-sectional view schematically showing a mode of the outlet passage 8y.

FIG. 4 is a cross-sectional view taken along the line B-B of FIG. 2. The upper side of the sheet of FIG. 4 corresponds to the front side of FIG. 2; the vertical direction of the sheet of FIG. 4 is the depth direction of the outlet passage 8y.

As shown in FIGS. 2 and 4, the outlet passages 8y, 8y, . . . are formed such that the depth of the downstream region (The region is shown as "Y2" in FIG. 4; below, it is the same.) is larger than that of the upstream region (The region is shown as "X2" in FIG. 4; below, it is the same.). So, it is possible to lower the flow rate of hydrogen passing through the downstream region of the outlet passages 8y, 8y, . . . and also possible to inhibit removal of excessive amount of water from a part of region of the MEA 4 facing the downstream region of the outlet passages 8y, 8y, . . . . In addition, since the outlet passages 8y, 8y, . . . are formed such that the depth of the downstream region is larger than that of the upstream region, it is capable of increasing the side surface area at the downstream region of the outlet passages 8y, 8y, . . . cooled with a cooling medium. By the above structure, it is possible to inhibit extreme temperature increase at a part of region of the MEA 4 facing the downstream region of the outlet passages 8y, 8y, . . . ; whereby evaporation of excessive amount of water (removal of excessive amount of water) from the region of the MEA 4 can be inhibited. By inhibiting removal of excessive amount of water, desiccation of the part of region of the MEA 4 facing the downstream region of the outlet passages 8y, 8y, . . . can be inhibited; hence, the fuel cell 10 can inhibit desiccation of the MEA 4.

Moreover, as shown in FIGS. 2 and 4, the outlet passages 8y, 8y, . . . are formed such that the depth of the upstream region is smaller than that of the downstream region. Due to this, it is possible to raise flow rate of hydrogen passing through the upstream region of the outlet passages 8y, 8y, . . . and also possible to increase the amount of water removed from the upstream region of the outlet passages 8y, 8y, . . . and a part of region of the laminated body 7 facing the upstream region of the outlet passages 8y, 8y, . . . . By increasing the amount of water to be removed, it is possible to inhibit flooding at the upstream region of the outlet passages 8y, 8y, . . . and the part of region of the laminated body 7 facing the upstream region of the outlet passages 8y, 8y, . . . ; thereby, the fuel cell 10 can inhibit flooding.

Figure 5:
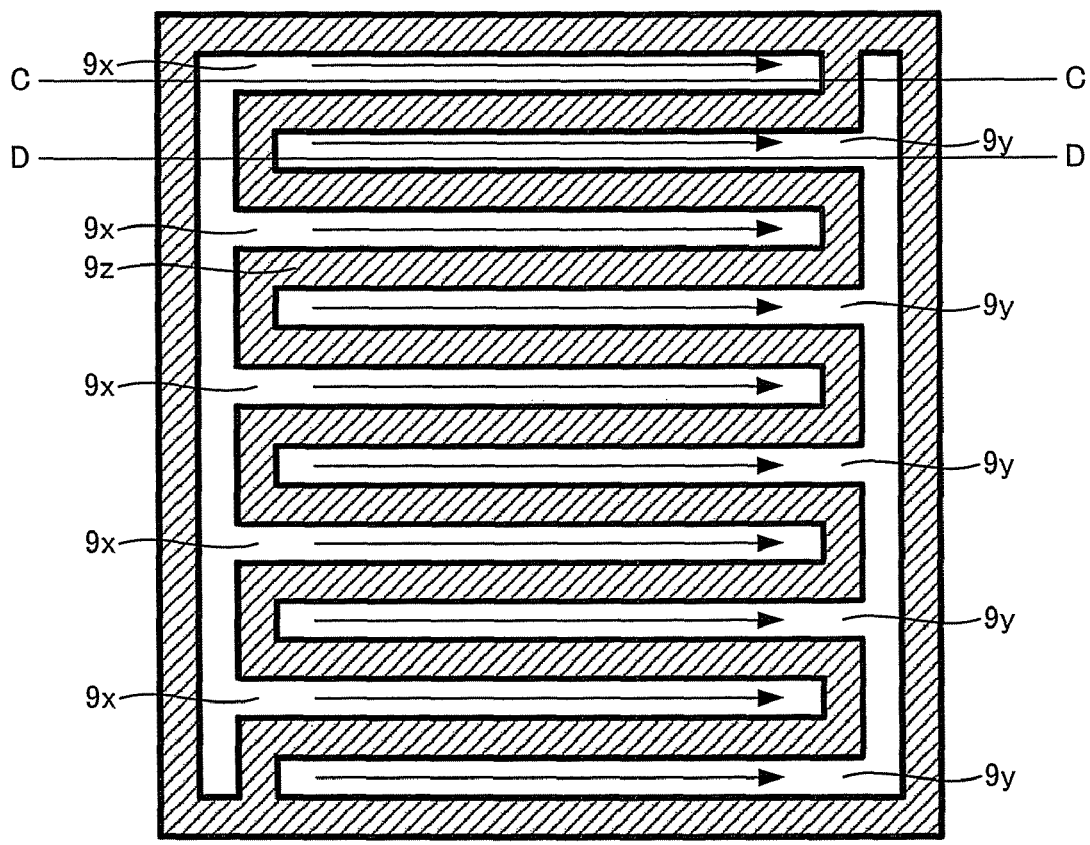
FIG. 5 is a plan view schematically showing a mode of the separator 9.

FIG. 5 is a plan view schematically showing a mode of the separator 9. The front-to-back direction of the sheet of FIG. 5 is the depth direction of the inlet passage 9x, 9x, . . . and the outlet passage 9y, 9y, . . . . The arrows of FIG. 5 show flow direction of the air; the left side of the sheet of FIG. 5 corresponds to the front side of FIG. 1.

As shown in FIG. 5, the inlet passages 9x, 9x, . . . are blocked at the downstream end of the air and the outlet passages 9y, 9y, . . . are blocked at the upstream end of the air. As shown in FIG. 5, the inlet passages 9x, 9x, . . . and the outlet passages 9y, 9y, . . . respectively provided to the separator 9 are alternately and separately arranged; these are not connected to each other. Because of this, in the fuel cell 10, the air supplied through the inlet passages 9x, 9x, . . . diffuses towards the gas diffusion layer 6 and the cathode catalyst layer 3; subsequently, the air having passed through the gas diffusion layer 6 and the cathode catalyst layer 3 reaches the outlet passages 9y, 9y, . . . . Therefore, according to the fuel cell 10, it is possible to easily diffuse the air into the gas diffusion layer 6 and the region of the cathode catalyst layer 3 (hereinafter, refer to as "the projection portion 9z facing region".) both of which face the projection portion 9z formed between neighboring the inlet passage 9x and the outlet passage 9y. Hence, the fuel cell 10 can inhibit pool of liquid water in the projection portion 9z facing region and eventually inhibit flooding.

Figure 6:
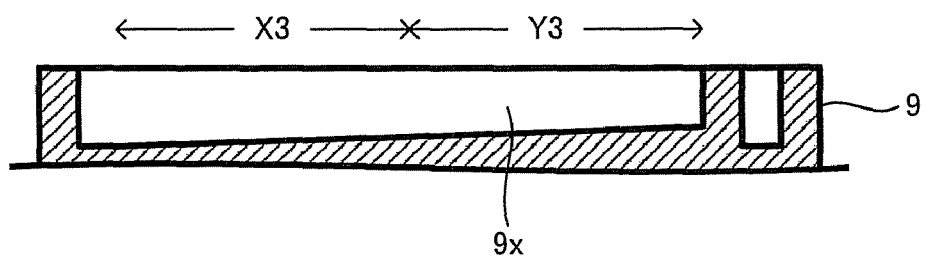
FIG. 6 is a cross-sectional view schematically showing a mode of the inlet passage 9x.

FIG. 6 is a cross-sectional view taken along the line C-C of FIG. 5. The upper side of the sheet of FIG. 6 corresponds to the front side of FIG. 5; the vertical direction of FIG. 6 is the depth direction of the inlet passage 9x.

As shown in FIGS. 5 and 6, the inlet passages 9x, 9x, . . . are formed such that the depth of the upstream region (The region is shown as "X3" in FIG. 6; below, it is the same.) is larger than that of the downstream region (The region is shown as "Y3" in FIG. 6; below, it is the same.). So, it is possible to lower the flow rate of the air passing through the upstream region of the inlet passages 9x, 9x, . . . and also possible to inhibit removal of excessive amount of water from a part of region of the MEA 4 facing the upstream region of the inlet passages 9x, 9x, . . . . In addition, since the inlet passages 9x, 9x, . . . are formed such that the depth of the upstream region is larger than that of the downstream region, it is capable of increasing the side surface area at the upstream region of the inlet passage 9x, 9x, . . . cooled with a cooling medium. By the above structure, it is possible to inhibit extreme temperature increase at a part of region of the MEA 4 facing the upstream region of the inlet passages 9x, 9x, . . . ; whereby evaporation of excessive amount of water (removal of excessive amount of water) from the region of the MEA 4 can be inhibited. By inhibiting removal of excessive amount of water, desiccation of the part of region of the MEA 4 facing the upstream region of the inlet passages 9x, 9x, . . . can be inhibited; hence, the fuel cell 10 can inhibit desiccation of the MEA 4.

Moreover, as shown in FIGS. 5 and 6, the inlet passages 9x, 9x, . . . are formed such that the depth of the downstream region is smaller than that of the upstream region. Due to this, it is possible to raise flow rate of the air passing through the downstream region of the inlet passages 9x, 9x, . . . and also possible to increase the amount of water removed from the downstream region of the inlet passages 9x, 9x, . . . and a part of region of the laminated body 7 facing the downstream region of the inlet passages 9x, 9x, . . . . By increasing the amount of water to be removed, it is possible to inhibit flooding at the downstream region of the inlet passages 9x, 9x, ... and the part of region of the laminated body 7 facing the downstream region of the inlet passages 9x, 9x, ...; thereby, the fuel cell 10 can inhibit flooding.

Figure 7:
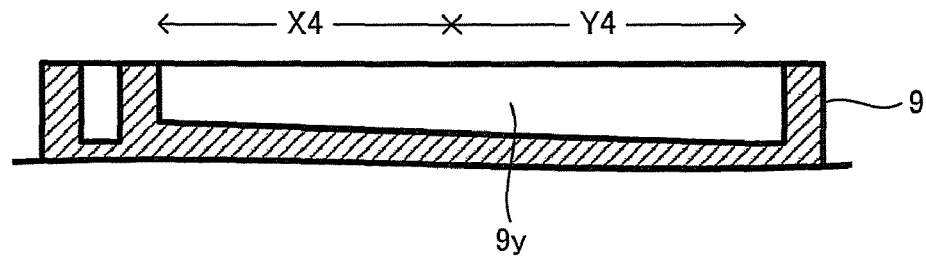
FIG. 7 is a cross-sectional view schematically showing a mode of the outlet passage 9y.

FIG. 7 is a cross-sectional view taken along the line D-D of FIG. 5. The upper side of the sheet of FIG. 7 corresponds to the front side of FIG. 5; the vertical direction of the sheet of FIG. 7 is the depth direction of the outlet passage 9y.

As shown in FIGS. 5 and 7, the outlet passages 9y, 9y, ... are formed such that the depth of the downstream region (The region is shown as "Y4" in FIG. 7; below, it is the same.) is larger than that of the upstream region (The region is shown as "X4" in FIG. 7; below, it is the same.). So, it is possible to lower the flow rate of the air passing through the downstream region of the outlet passages 9y, 9y, ... and also possible to inhibit removal of excessive amount of water from a part of region of the MEA 4 facing the downstream region of the outlet passages 9y, 9y, .... In addition, since the outlet passages 9y, 9y, ... are formed such that the depth of the downstream region is larger than that of the upstream region, it is capable of increasing the side surface area at the downstream region of the outlet passages 9y, 9y, ... cooled with a cooling medium. By the above structure, it is possible to inhibit extreme temperature increase at a part of region of the MEA 4 facing the downstream region of the outlet passages 9y, 9y, ...; whereby evaporation of excessive amount of water (removal of excessive amount of water) from the region of the MEA 4 can be inhibited. By inhibiting removal of excessive amount of water, desiccation of the part of region of the MEA 4 facing the downstream region of the outlet passages 9y, 9y, ... can be inhibited; hence, the fuel cell 10 can inhibit desiccation of the MEA 4.

Moreover, as shown in FIGS. 5 and 7, the outlet passages 9y, 9y, ... are formed such that the depth of the upstream region is smaller than that of the downstream region. Due to this, it is possible to raise flow rate of the air passing through the upstream region of the outlet passages 9y, 9y, ... and also possible to increase the amount of water removed from the upstream region of the outlet passages 9y, 9y, ... and a part of region of the laminated body 7 facing the upstream region of the outlet passages 9y, 9y, .... By increasing the amount of water to be removed, it is possible to inhibit flooding at the upstream region of the outlet passages 9y, 9y, ... and the part of region of the laminated body 7 facing the upstream region of the outlet passages 9y, 9y, ...; thereby, the fuel cell 10 can inhibit flooding.

In the above description of the fuel cell 10, the separator 8 comprising the depth-controlled inlet passages 8x, 8x, ... and the depth-controlled outlet passages 8y, 8y, ... is arranged at the anode catalyst layer 2 side; while, the separator 9 comprising the depth-controlled inlet passage 9x, 9x, ... and the depth-controlled outlet passage 9y, 9y, ... is arranged at the cathode catalyst layer 3 side. However, the invention is not limited to the mode. The fuel cell of the invention only requires the depth-controlled inlet passages or a separator comprising both the depth-controlled inlet passages and the depth-controlled outlet passages being arranged on at least the cathode catalyst layer side. It should be noted that in view of providing a mode of the fuel cell capable of easily inhibiting desiccation and flooding of the MEA, the depth-controlled inlet passage or a separator comprising both the depth-controlled inlet passage and the depth-controlled outlet passage is preferably arranged on both the anode catalyst layer side and the cathode catalyst layer side.

In the above description of the fuel cell 10, the separator 9 comprising the depth-controlled inlet passage 9x, 9x, ... and the depth-controlled outlet passage 9y, 9y, ... is shown; the separator to be arranged on the cathode catalyst layer side of the fuel cell is not restricted by the mode. The separator to be arranged on the cathode catalyst layer side of the fuel cell of the invention is only required to have depth-controlled passages such that the depth of at least the upstream region of the inlet passage is larger than that of the downstream region of the inlet passage. It should be noted that in view of providing a mode of the fuel cell capable of easily inhibiting desiccation and flooding of the MEA, the separator, which comprises: the inlet passages whose depth is controlled such that the depth of the upstream region is larger than that of the downstream region; and the outlet passage whose depth is controlled such that the depth of the downstream region is larger than that of the upstream region, is preferably arranged on the cathode catalyst layer side.

Moreover, in the above description of the fuel cell 10, the separator 8 comprising the depth-controlled inlet passages 8x, 8x, ... and the depth-controlled outlet passages 8y, 8y, ... is shown as a mode; the separator to be arranged on the anode catalyst layer side of the fuel cell of the invention is not limited by the mode. The separator to be arranged on the anode catalyst layer side of the fuel cell of the invention may be a mode having only passages whose inlet port and outlet port are opened for hydrogen passing through; there may also be a mode comprising the inlet passages and the outlet passages having a certain depth along the entire length of the hydrogen flow direction. Apart from these, another mode of the separator may comprises: depth-controlled inlet passages, as hydrogen passage, such that the depth of the upstream region is larger than that of the downstream region; and the outlet passages having a certain depth along the entire length of the hydrogen flow direction. It should be noted that in view of providing a mode of fuel cell capable of easily inhibiting desiccation and flooding of the MEA, there may be a separator, which comprises: inlet passages whose depth at the upstream region is controlled to be larger than that of the downstream region; and outlet passages whose depth at the downstream region is controlled to be larger than that of upstream region, is preferably arranged on the anode catalyst layer side.

Further, the above description of the fuel cell 10 shows a mode where the hydrogen flow direction and the air flow direction are facing each other; the fuel cell of the invention is not limited by the mode. About the fuel cell of the invention, the hydrogen flow direction and the air flow direction can be the same.

In the description of the fuel cell 10, it shows the separator 8 comprising substantially linear inlet passages 8x, 8x, ... and substantially linear outlet passages 8y, 8y, ... as well as the separator 9 comprising substantially linear inlet passages 9x, 9x, ... and substantially linear outlet passages 9y, 9y, ...; the fuel cell of the invention is not limited to the mode. All of the inlet passages, outlet passages, and passages whose inlet port and outlet port of hydrogen are opened to be provided to the fuel cell of the invention may be curved (for example, the shape is so-called "serpentine-shape").

When applying the present invention to a fuel cell having a cell-stacked body formed by stacking a plurality of unit cells, the cell-stacked body may be formed only by unit cells, in which the separator comprising the inlet passages and the outlet passages is arranged at least at the cathode catalyst layer side, wherein depth of at least the inlet passages are controlled; or the cell-stacked body may also have the unit cell being arranged at a part of the stacked body. In the case to arrange the unit cell at a part of the cell-stacked body, the layout is not specifically limited; compared with the unit cells located in the center of the cell-stacked body, it is preferable to arrange the unit cells at the end of the cell-stacked body where the unit cells tend to be exposed to low-temperature environment. Accordingly, by having the mode, occurrence of flooding can be easily inhibited.

Industrial Applicability

The fuel cell of the present invention can be used as a power source of battery car or a portable power supply.

The invention claimed is:

1. A fuel cell comprising:
   a laminated body comprising at least a membrane electrode assembly which includes: an electrolyte membrane, an anode catalyst layer arranged on one surface of the electrolyte membrane, and a cathode catalyst layer arranged on the other surface of the electrolyte membrane; and
   a pair of separators sandwiching the laminated body,
   wherein, along the laminated body side surface of at least one separator, an inlet passage is provided for getting through a reaction gas supplied to the laminated body and an outlet passage is provided for getting through a reaction gas having passed through the laminated body;
   the inlet passage is blocked at a downstream end of the reaction gas being supplied to the laminated body and the outlet passage is blocked at an upstream end of the reaction gas having passed through the laminated body;
   the inlet passage and the outlet passage are arranged separately from each other along the separator; and
   the depth of the upstream region of the inlet passage is larger than that of the downstream region of the inlet passage.

2. The fuel cell according to claim 1, wherein, along the separator where the inlet passage and the outlet passage are arranged, the depth of the downstream region of the outlet passage is larger than that of the upstream region of the outlet passage.

3. The fuel cell according to claim 1, wherein the one separator is arranged on the side of the cathode catalyst layer.

* * * * *